N. S. DODGE.
CONVEYER BELT.
APPLICATION FILED NOV. 8, 1909.

989,952.

Patented Apr. 18, 1911.

Witnesses.
Thos. Astbury
F. E. Maynard.

Inventor.
Nathaniel S. Dodge
by G. H. Strong
Atty.

UNITED STATES PATENT OFFICE.

NATHANIEL S. DODGE, OF ALAMEDA, CALIFORNIA.

CONVEYER-BELT.

989,952.  Specification of Letters Patent.  Patented Apr. 18, 1911.

Application filed November 8, 1909. Serial No. 526,778.

*To all whom it may concern:*

Be it known that I, NATHANIEL S. DODGE, citizen of the United States, residing at Alameda, in the county of Alameda and State of California, have invented new and useful Improvements in Conveyer-Belts, of which the following is a specification.

My invention relates to conveyer belts, and pertains especially to a belt for use with troughing idlers, such as used on a tailings stacker on a dredger, or for conveying other rough, irregular and heavy substances.

The invention consists of the parts and the construction and combination of parts as hereinafter more fully described and claimed, having reference to the accompanying drawings, in which—

Figure 1:
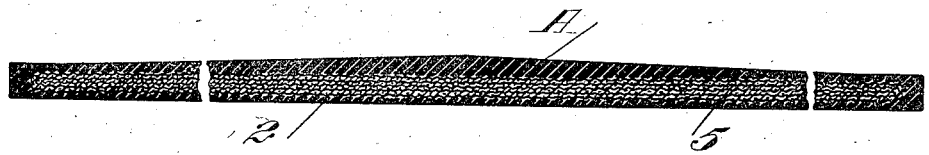
Figure 2:
Figure 3:
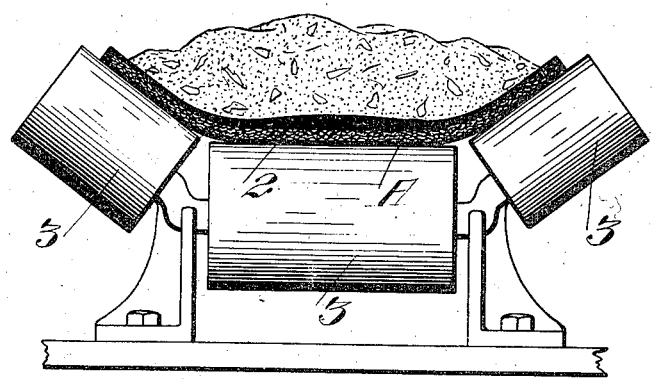
Figure 4:
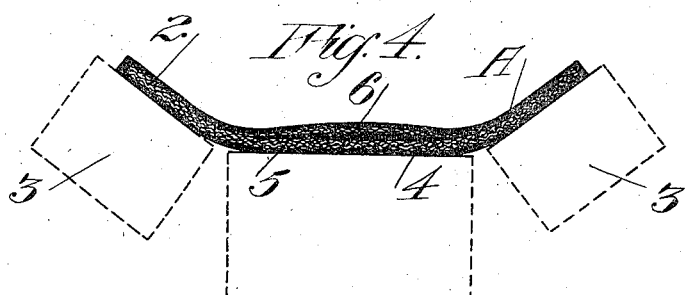

Figure 1 is a cross-section of the belt. Fig. 2 is a similar section showing a modification. Fig. 3 is a cross-section showing the belt in position on the carrier rollers. Fig. 4 is a similar view showing the belt of Fig. 2 in position.

The rubber cover A of the belt 2 is thin on the sides and thick in the center. As these conveyer belts carry their load in a pyramid, as a rule, the heaviest load is in the center, and this center also takes three-quarters of the impact of the material when it falls upon it from the spouts or guides. This belt runs, as is the usual practice now in conveyer machinery, over the troughing idlers or carrier rollers 3, divided in three, two of which are at an angle, each with its own bearings, consequently placing the belt in the shape of a trough, thus allowing it to carry far greater loads, by preventing spilling. As my belt is made with a crowning surface, if it were run on a flat pulley it would have a tendency to throw the material toward the edges and spill it, and it would be a disadvantage instead of the opposite; but with the carrier or troughing idlers my belt presents a thick surface at the wearing point, or the center, and it gradually decreases in thickness until the sides are reached, where there is no necessity for a heavy cover of rubber, for there is no wear at these outside points.

As shown in Fig. 2, I have also found it a valuable improvement to place a considerable body of rubber, as 4, between the main plies 5 and the outside ply or plies 6 at the crowned surface, thus obtaining the advantage of the thickness and consequent resiliency; placing the strong canvas 6 close to the surface prevents stripping of the main body of soft rubber should the belt become caught in any obstacle.

In both these constructions of belt it is to be noted that none of the canvas is cut away, that the full strength of the belt is preserved by maintaining the same number of plies throughout the width of the belt, and that the center of the belt has just as much canvas as the edges of the belt. The only difference between Figs. 1 and 2 is that in Fig. 1, first described, all the plies lie close together and parallel, with the thickness of rubber along the crown of the belt lying principally above the canvas; while in Fig. 2, representing the modification, there is the same number of plies at the center as at the edges, and the same number, practically, as represented in Fig. 1, the top ply is lifted up and an additional rubber filling placed between this top ply and the underneath main plies 5, and also an additional coating of rubber is placed on top of the upper reinforcing ply 6.

Having thus described my invention, what I claim and desire to secure by Letters Patent is—

1. A fabric rubber coated belt for conveying rough irregular and heavy substances, said belt having a like number of plies throughout its width and having a rubber filler inserted between its plies along its central portion said filler being thickest at its center and tapering in thickness from the center toward each side edge.

2. A fabric rubber-coated belt for conveying rough irregular and heavy substance, said belt having a like number of plies throughout its width, and having an extra ply of fabric and a rubber filler along the central portion of the belt, said filler being thickest at its center and tapering in thickness from the center toward each side edge and inserted between the plies of the belt and said extra ply, said belt having an outer rubber coating.

3. A carrier belt having a fabric body with a rubber covering, the fabric body of uniform thickness throughout the width of the belt, and the rubber coating being thickest at the center of the belt and tapering toward the sides, and a ply of canvas integral with said fabric body and raised above the same and embedded in the rubber coating.

4. A conveyer belt comprising a body of fabric consisting of the same number of plies throughout the width of the belt, the topmost ply raised from the body of fabric, and a rubber filler inserted between the topmost ply and the body of fabric to render the belt thicker at the middle than at the sides.

5. A carrier belt having a fabric body with a convexed rubber-covered carrying surface, and a ply of fabric raised from said body of fabric and reinforcing said convexed rubber covering, said reinforcing ply being integral with said body of fabric.

In testimony whereof I have hereunto set my hand in the presence of two subscribing witnesses.

NATHANIEL S. DODGE.

Witnesses:
CHARLES A. PENFIELD,
CHARLES EDELMAN.